(12) United States Patent
Chepets

(10) Patent No.: US 11,912,112 B2
(45) Date of Patent: Feb. 27, 2024

(54) EXTENDIBLE ROOF MOUNTED VEHICULAR SUNSHADE

(71) Applicant: Igor Chepets, Brooklyn, NY (US)

(72) Inventor: Igor Chepets, Brooklyn, NY (US)

( * ) Notice: Subject to any disclaimer, the term of this patent is extended or adjusted under 35 U.S.C. 154(b) by 33 days.

(21) Appl. No.: 17/530,247

(22) Filed: Nov. 18, 2021

(65) Prior Publication Data

US 2023/0150344 A1     May 18, 2023

(51) Int. Cl.
*B60J 3/00*     (2006.01)
*B60J 11/04*     (2006.01)
*B60J 11/06*     (2006.01)
*B60R 11/00*     (2006.01)

(52) U.S. Cl.
CPC ............... *B60J 3/005* (2013.01); *B60J 11/04* (2013.01); *B60J 11/06* (2013.01); *B60R 2011/004* (2013.01)

(58) Field of Classification Search
USPC .................................. 296/96, 99.1, 98, 95.1
See application file for complete search history.

(56) References Cited

U.S. PATENT DOCUMENTS

| | | | |
|---|---|---|---|
| 1,336,953 A * | 4/1920 | Gervig | B60J 3/005 296/99.1 |
| 1,659,825 A * | 2/1928 | Mackay | E04H 15/06 296/99.1 |
| 3,957,301 A * | 5/1976 | Huber | B60J 11/00 135/90 |
| 4,836,232 A * | 6/1989 | De Rosa | E04H 15/003 135/147 |
| 4,848,827 A * | 7/1989 | Ou | B60J 11/00 296/99.1 |
| 6,035,874 A * | 3/2000 | Po-Chang | E04H 15/50 135/145 |
| 6,257,259 B1 * | 7/2001 | Ardouin | B60J 11/08 135/96 |
| 7,344,182 B1 * | 3/2008 | Weddell | E04F 10/0633 160/67 |
| 11,167,630 B1 * | 11/2021 | Guma | B60J 11/04 |
| 2009/0072578 A1 * | 3/2009 | Wang | B60J 11/06 296/136.12 |

FOREIGN PATENT DOCUMENTS

KR     20140001273 U   *   3/2014
WO     WO-2004099528 A1   *   11/2004     ............. B60J 11/00

* cited by examiner

*Primary Examiner* — Amy R Weisberg
*Assistant Examiner* — Veronica M Shull
(74) *Attorney, Agent, or Firm* — Mestechkin Law Group P.C.

(57) ABSTRACT

An extendible roof mounted automotive accessory is provided that includes at least one generally horizontal panel; at least one strut having a first end and a second end opposite the first end, where the at least one strut is pivotally coupled at the first end to the at least one panel; and at least one coupling, where the at least one strut is pivotally coupled at the second end to the at least one coupling. The accessory is configured therewith so that the panel may be extended from a first position to a second position within a horizontal plane above a roof of a vehicle so as to provide shade or other functionality to the vehicle.

9 Claims, 2 Drawing Sheets

EXTENDIBLE ROOF MOUNTED VEHICULAR SUNSHADE

BACKGROUND

This patent application relates to automotive accessories and more particularly roof mounted accessories for passenger vehicles, such as cars and sport utility vehicles.

Many roof mounted accessories exist for increasing the utility of a vehicle, including, for example, bike racks, cargo racks, sunshades or awnings, etc. Regardless of the type though, these racks have significant limitations. For example, cargo racks have limited adjustability once attached to the vehicle. In this regard, it may be difficult to access parts of the vehicle below the rack, such as the sunroof. With respect to sunshades or awnings, these are similar to a tent insofar as poles and often guide wires are required to set up when needed. These accessories may therefore be difficult for some users to mount to the vehicle and/or set up at the site. Accordingly, there is a need for an automotive roof mounted accessory that is not so limited.

SUMMARY

In one aspect, an extendible roof mounted automotive accessory is provided that includes at least one panel; at least one strut having a first end and a second end opposite the first end, wherein the at least one strut is pivotally coupled at the first end to the at least one panel; and at least one coupling, wherein the at least one strut is pivotally coupled at the second end to the at least one coupling, the accessory configured therewith so that the panel may be extended from a first position to a second position within a horizontal plane above a roof of a vehicle.

In one embodiment, the vehicle has a front to rear centerline, the first position is a fully retracted position, the second position is a fully extended position, and wherein in the fully extended position the at least one strut is perpendicular to the front to rear centerline of the vehicle.

In one embodiment, in the fully retracted position, the at least one strut is parallel to the front to rear centerline of the vehicle.

In one embodiment, the at least one strut comprises a plurality of struts.

In one embodiment, the plurality of struts have the same length.

In one embodiment, the plurality of struts are parallel to each other between the first and second positions.

In one embodiment, the at least one coupling comprises a plurality of couplings, and a length of at least one of the struts is equal to or greater than a distance between the plurality of couplings.

In one embodiment, the at least one strut is operable to pivot at 180 degrees in the horizontal plane.

In one embodiment, the at least one strut is operable to pivot at 360 degrees in the horizontal plane.

In one embodiment, the accessory further includes a guide bar, wherein at least one coupling is attached to the guide bar.

In another aspect, a roof mounted automotive accessory is provided that includes a plurality of panels; a plurality of struts each having a first end and a second end opposite the first end, wherein each of the plurality of struts are pivotally coupled at the first end thereof to one of the plurality of panels; and a plurality of couplings, wherein each of the plurality of struts is pivotally coupled at the second end thereof to one of the plurality of couplings, the accessory configured therewith so that each of the panels may be extended from a first position to a second position within a horizontal plane above a roof of a vehicle.

In one embodiment, the vehicle has a front to rear centerline, the first position is a fully retracted position, the second position is a fully extended position, and wherein in the fully extended position each of the plurality of struts is perpendicular to the front to rear centerline of the vehicle.

In one embodiment, in the fully retracted position, each of the plurality of struts is parallel to the front to rear centerline of the vehicle.

In one embodiment, the plurality of struts comprises a pair of struts for each of the panels and wherein the pair of struts for a given panel have the same length.

In one embodiment, the plurality of struts for a given panel are parallel to each other between the first and second positions.

In one embodiment, the plurality of couplings comprise a pair of couplings for each of the panels, and wherein a length of at least one of the pair of struts is equal to or greater than a distance between the pair of couplings for a given panel.

In one embodiment, the at least one strut is operable to pivot at 180 degrees in the horizontal plane.

In one embodiment, the at least one strut is operable to pivot at 360 degrees in the horizontal plane.

In one embodiment, the accessory includes a guide bar, wherein the plurality of couplings are attached to the guide bar.

DETAILED DESCRIPTION

The present application provides a roof mounted automotive accessory that is preferably easy to set between a plurality of positions, including fully extended and retracted positions. In a preferred embodiment, the accessory may be used as a sunshade and the components thereof are therefore dimensioned structurally to provide this functionality. It is understood that this accessory may also provide additional roof top storage capacity and the dimensions of the components thereof may therefore be structurally more robust.

Figure 1:
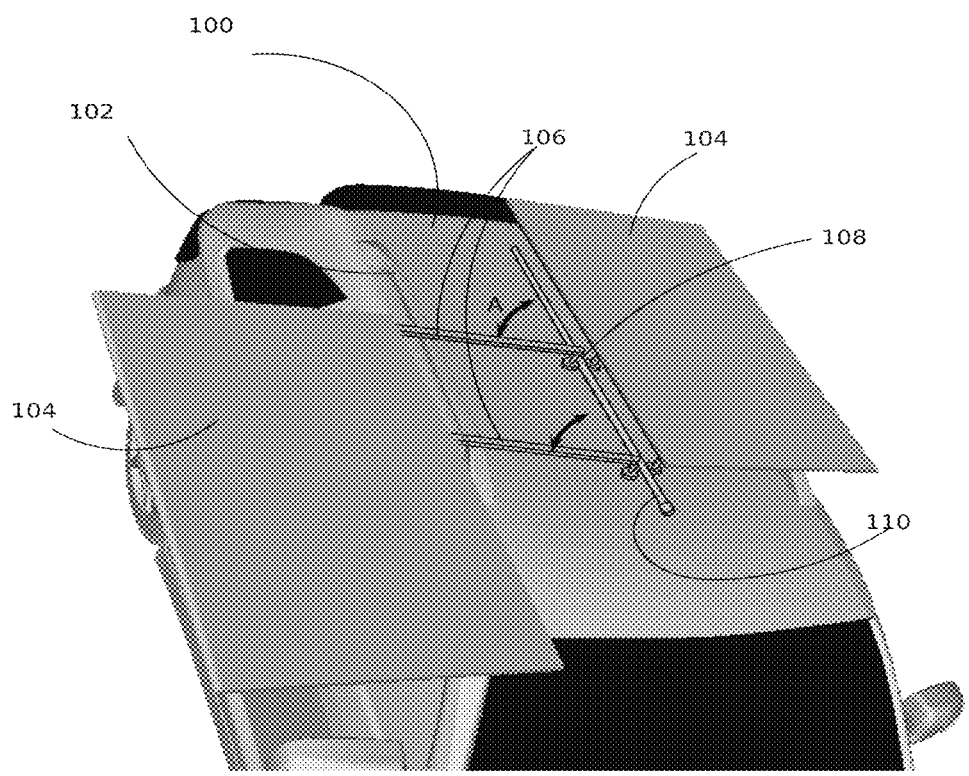
FIG. 1 is a perspective view showing the top of an extendible roof mounted automotive accessory according to at least one of the embodiments of the accessories disclosed herein disposed in a partially extended position.
Figure 2:
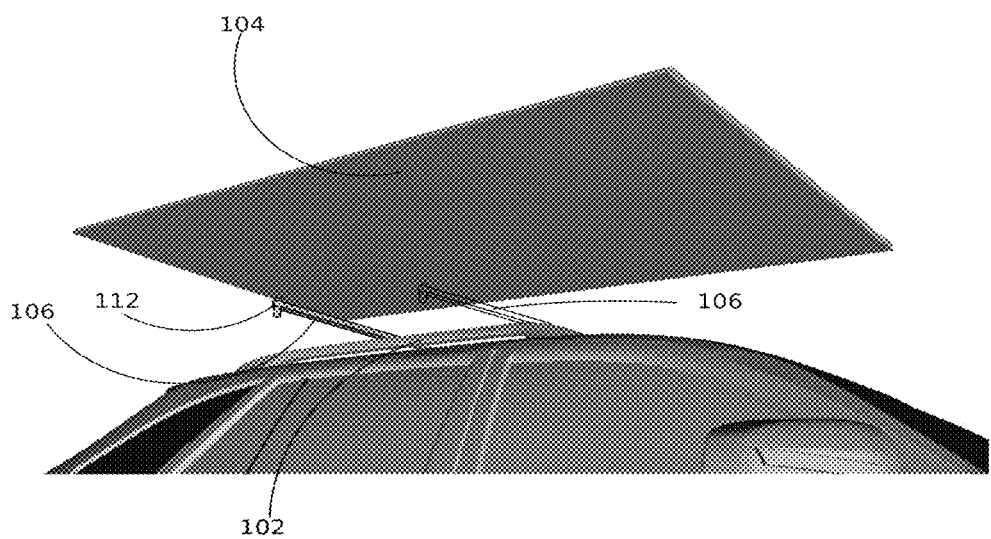
FIG. 2 is a perspective view showing the bottom of an extendible roof mounted automotive accessory according to at least one of the embodiments of the accessories disclosed herein disposed in a partially extended position.

Referring to FIGS. 1-2, the accessory is generally installed or installable on the roof of a vehicle 100. The accessory may be installed on any type of vehicle 100, including an SUV as shown. The vehicle 100 may have roof rails 102 as well as cross bars (not shown) that are attached to and span the distance between the roof rails 102. The accessory may also be installed on vehicles without roof rails 102 and/or cross bars, as discussed in greater detail below.

The accessory generally includes at least one or preferably a pair of panels 104, each of the panels 104 configured to extend in a horizontal plane over the roof of the vehicle 100 outward from at least one side of the vehicle. The panel 104 may be a continuous sheet material or a frame covered with a translucent material. The panels 104 may be any shape, including rectangular as shown. The panels 104 may be configured to be extendible in this regard (to extend in a horizontal plane) in a variety of ways. In a preferred embodiment, the panels 104 are pivotally attached to one or a plurality of struts 106. When a plurality of struts 104 for each panel 104 are used, the struts 106 for a given panel are preferably parallel to each other throughout the range of their motion. The struts 106 are also pivotally coupled to the vehicle via one or more couplings 108. In the fully extended position, the struts 106 are perpendicular to the front-rear centerline of the vehicle. In the fully retracted position, the struts 106 are preferably parallel with this centerline of the vehicle. In this regard, the distance between the couplings 108 of a given panel is preferably equal to or greater than a length of the struts 106. Moreover, the struts 106 pivot at an angle A, as shown, that is at least 90 degrees, preferably 180 degrees, or when a single panel is used, 360 degrees.

The couplings 108 generally attach to the vehicle or any part thereof. For example, for a vehicle without any rails or rails without cross bars, the couplings 108 may be a suction cup or preferably a vacuum suction cup for securely attaching the coupling 108 and thus the proximal end of the strut 106 to the vehicle's roof directly. Where the vehicle has cross bars, the coupling 108 may include U bolts or some other clamping mechanism that attaches it to the cross bars. Optionally, the couplings 108 may be attached to each other via a guide bar 110. That is, the couplings 108 may be attached to the guide bar 110, which bar 110 may then be attached to the cross bars of the vehicle. At the distal end of the struts 108, the panels 104 are attached thereto via a pivoting connection 112. The pivoting connection 112 pivots along an axis that is perpendicular to the horizontal plane over the roof of the vehicle.

In operation, the accessory may be configured in the fully retracted position, for example, for transport to the site. The accessory may include a wind deflector at the front end of the vehicle (not shown) which causes wind at speed to flow over the accessory and to therefore push the front end of the panels 104 downward. The distal sides of the panels 104 may include clips or other means for attaching the sides thereof to the roof rail, the guide bar 110, and/or the other panel 104 for transport. To extend the panels 104, the attaching means may be undone to allow the panels to extend outward from the vehicle. Once undone, the user may pull the panels 104 outward from the vehicle, which causes the struts 106 to move from the initial position, for example, parallel to the centerline of the vehicle, to a second position, for example, 90 degrees from the initial position. In at least this position, the struts 106 may rest against the side rails 102. In this configuration, the panels will provide shade over the side doors of the vehicle, as shown. The panels may be moved forward (up to 180 degrees) to provide shade for the windshield.

While the foregoing has been described in some detail for purposes of clarity and understanding, it will be appreciated by one skilled in the art, from a reading of the disclosure, that various changes in form and detail can be made without departing from the true scope of the invention.

The invention claimed is:

1. A roof mounted automotive accessory comprising:
   at least one planar panel;
   a plurality of struts each having a first end and a second end opposite the first end, wherein each of the plurality of struts is pivotally coupled at the first end to the at least one panel; and
   a plurality of couplings, wherein each of the plurality of struts is pivotally coupled at the second end to at least one of the plurality of couplings, the accessory configured therewith for the panel to be extended from a first position to a second position within a horizontal plane above a roof of a vehicle, and such that the plurality of struts are parallel to each other in the first position, the second position, and throughout between the first and second positions, and wherein the at least one planar panel retains its planar shape in at least the first and the second positions.

2. The roof mounted automotive accessory of claim 1, wherein the vehicle has a front to rear centerline, the first position is a fully retracted position, the second position is a fully extended position, and wherein in the fully extended position each of the plurality of struts is perpendicular to the front to rear centerline of the vehicle.

3. The roof mounted automotive accessory of claim 2, wherein in the fully retracted position, each of the plurality of struts is parallel to the front to rear centerline of the vehicle.

4. The roof mounted automotive accessory of claim 1, wherein the plurality of struts have a same length.

5. The roof mounted automotive accessory of claim 1, wherein a length of each of the plurality of the struts is equal to or greater than a distance between the plurality of couplings.

6. The roof mounted automotive accessory of claim 1, wherein each of the plurality of struts is operable to pivot at 180 degrees in the horizontal plane.

7. The roof mounted automotive accessory of claim 1, wherein each of the plurality of struts is operable to pivot at 360 degrees in the horizontal plane.

8. The roof mounted automotive accessory of claim 1, comprising a guide bar, wherein the plurality of couplings are attached to the guide bar.

9. The roof mounted automotive accessory of claim 1, wherein the at least one panel retains a rectangular shape in the first position and in the second positions.

* * * * *